United States Patent [19]

Sheesley

[11] 4,030,791

[45] June 21, 1977

[54] ELECTRICAL CONTACT SYSTEM

[75] Inventor: Wilmer Lee Sheesley, Dauphin, Pa.

[73] Assignee: AMP Incorporated, Harrisburg, Pa.

[22] Filed: Aug. 6, 1976

[21] Appl. No.: 712,309

[52] U.S. Cl. ............................. 339/5 M; 310/71; 310/91; 339/17 R

[51] Int. Cl.² ...................................... H01R 39/00

[58] Field of Search ........... 339/5 M, 5 R, 5 S, 5 P, 339/17 R, 119 R, 120, 121; 310/71, 91

[56] References Cited

UNITED STATES PATENTS

| | | | |
|---|---|---|---|
| 2,501,686 | 3/1950 | Merkle | 310/71 |
| 3,983,429 | 9/1976 | Allardice, Jr. | 310/91 |

Primary Examiner—Roy Lake
Assistant Examiner—DeWalden W. Jones
Attorney, Agent, or Firm—Allan B. Osborne

[57] ABSTRACT

The present invention provides a system for supplying electrical current from a printed circuit board to an electrical motor rotatably positioned in an insulating housing. More particularly, the system includes two pair of cell contact members and two pair of collet tab members. The collet tab members include cylindrical tube sections which are received in arcuate fingers positioned at the ends of cantilever beams on the contact members.

2 Claims, 5 Drawing Figures

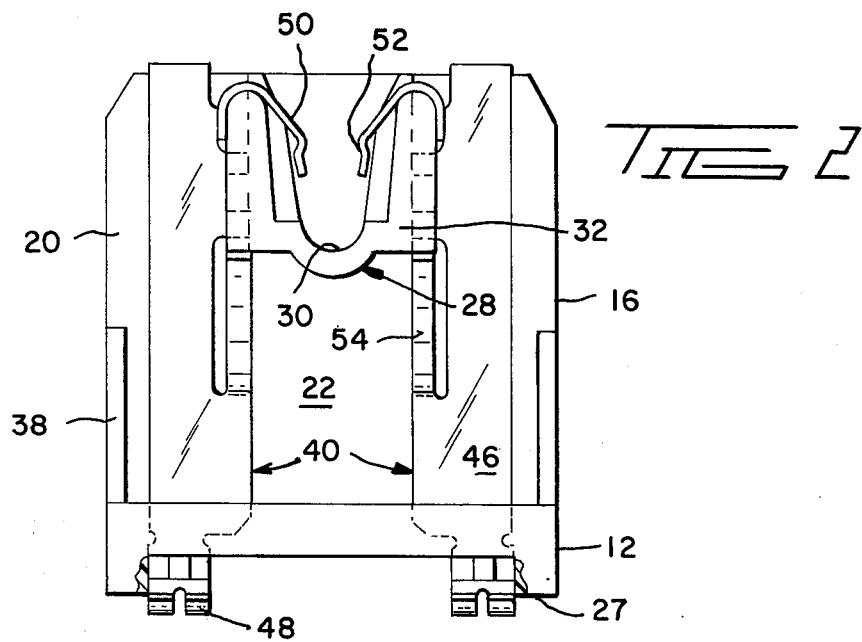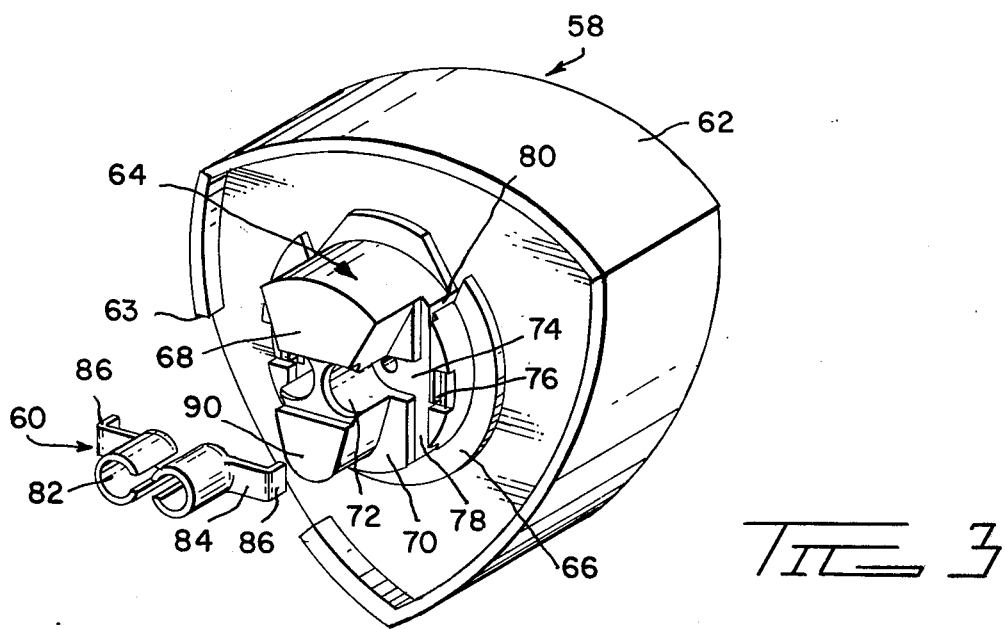

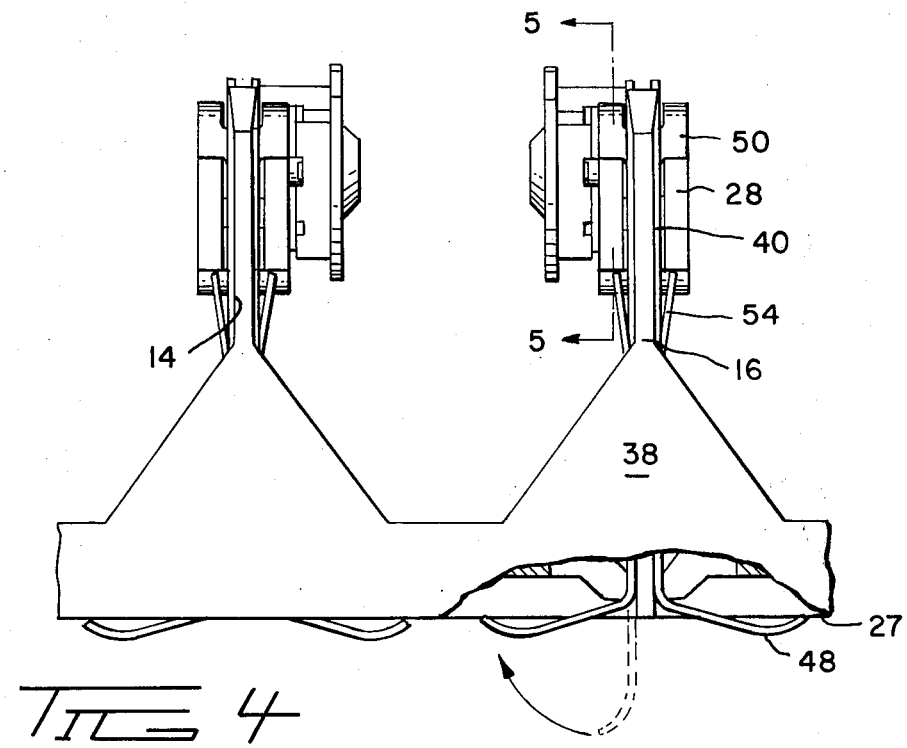
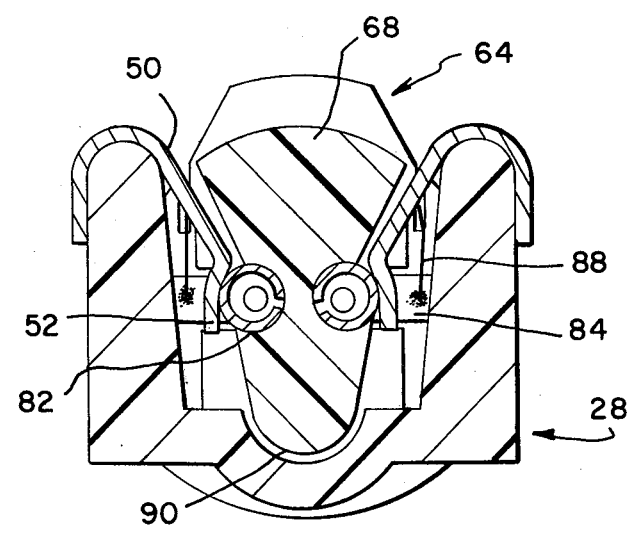

4,030,791

ELECTRICAL CONTACT SYSTEM

BACKGROUND OF THE INVENTION

1. Field of the Invention

This invention is in the field of providing an electrical path from a printed circuit board to an electrical motor suspended between two vertical walls.

2. Prior Art

There is no prior art known directed to the application herein disclosed.

BRIEF DESCRIPTION OF THE DRAWINGS

FIG. 2 is a view looking at one end of the housing and the two cell contact members positioned on the end wall;

FIG. 3 is a perspective view of a paired collet tabs of the present invention and of the triangular element onto which the collet tabs are positioned;

FIG. 4 is a side view of a housing cell illustrating the utility of the present invention; and FIG. 5 is a view taken along lines 5—5 in FIG. 4.

DESCRIPTION OF THE PREFERRED EMBODIMENT

Figure 1:
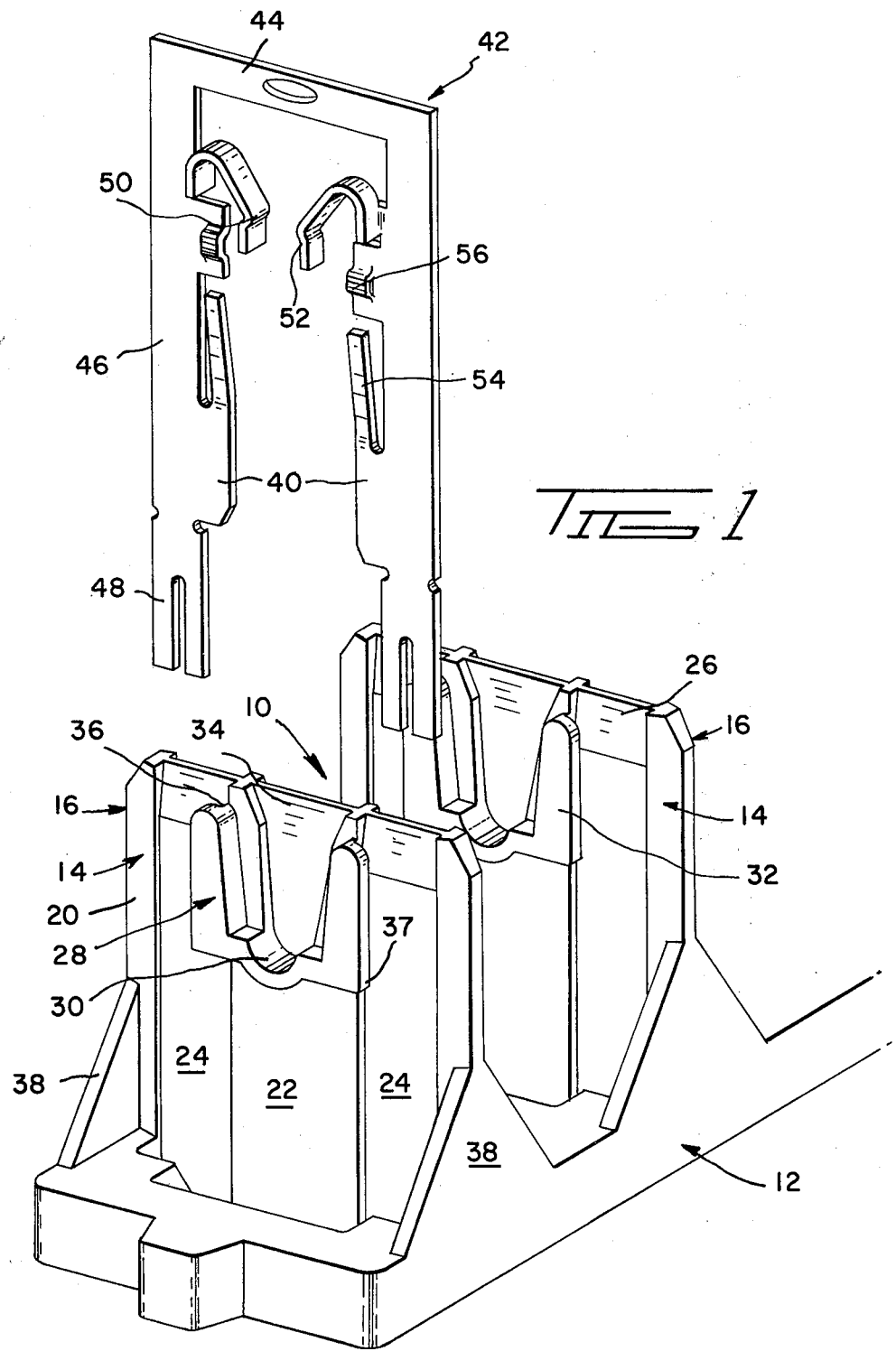
FIG. 1 is a perspective view of a paired cell contact member of the present invention and of the housing cell in which the contact members are positioned.

An electronic sign communication system has been developed which contains a very large number of triangular elements arranged on a billboard like fixture. The elements are rotatable about a fixed armature and each of the through sides are differently colored. By rotating the elements a message may be printed or a picture displayed. Different messages and pictures can be provided in rapid succession.

The present invention provides the means for supplying the current from an underlying circuit board to the fixed armature.

Each triangular element is positioned in an insulative housing cell 10 shown in FIG. 1. The cell shown is one of several extending along a base member 12 which may interlock both laterally and longitudinally with other like base members. A housing cell 10 consists of the two facing surfaces 14 of adjacent walls 16. When two base members are joined longitudinally the surface 14 on wall 16 facing the reader provides one half of a housing cell with a like surface on the adjacent base member (not shown) providing the other half.

Each surface 14 has vertical side rails 20 on each lateral side and a wide center rail 22 in the middle. The rails define a pair of tracks 24 with the center rail in between. The upper portion or mouth of each track may be beveled as indicated by reference numeral 26. The tracks open out on the bottom surface 27 of the base member 12.

On top of each center rail 22 is a support bracket 28. The bracket is U-shaped with the bight having an arcuate pocket 30. The sides or arms 32 of the bracket slope inwardly towards the bight. A generally U-shaped notch 34 is located in the center rail behind the bracket. This notch is smaller in width than the opening provided by the bracket except for the base thereof which provides a continuation of pocket 30.

Arms 32 extend over the edges of the center rail to form slots 36. A foot 37 at the base of each arm extends in towards track 24 but does not touch it. Walls 16 are supported on either side by triangular plates 38.

Each cell 10 has two pair or four cell contact members 40. Each pair 42 of contact members occupy one side of a cell and are mirror images of each other as FIG. 1 shows.

Cell contact members 40 are stamped and formed from a coplanar strip of conductive material such as beryllium copper. Each pair 42 of contact members are connected to adjacent pairs by a short strap (not shown) of material and each individual contact member 40 in a pair is connected together by strap 44 whose length is such that the pair of contact members can be positioned on a side as a connected unit.

A cell contact member 40 has an elongated body 46. At its lower end is a circuit board contact 48 which may be solid (not shown) or bifurcated as shown. Near the top of the member is a cantilever spring arm 50 which faces to one side of the body. The arm, from its point of attachment with the body is formed a short distance up, around a radius and then downwardly. The downward side is at an angle as shown. The free end of the arm is shaped into a semi-rounded or arcuate contact surface 52.

A tine 54 is blanked out from the body between the two ends. The tine's free end points upwardly. Just above the tine an arcuate detent 56 is swaged in the body. Both the tine and detent provide retaining means for holding the contact member in the housing cell.

FIG. 2 shows a pair of contact members positioned on one side of a cell 10. The body 46 occupys track 24 with contact 48 extending below the bottom surface 27 of the base member. The contact is bent to generally parallel the surface as shown more clearly in FIG. 4.

The portion of the body containing detent 56 is located in slot 36; i.e., behind the lateral extension of bracket 28. The detent being wedged into the slot, serves to immobilize the contact member. Tine 54 is just below the foot 37 on the bracket and restrains upward movement of the contact member. The cantilever spring arm 50 fits over the top of arm 32 on bracket 28 and extends down into the opening generally towards the arcuate pocket 30.

As noted above, cell contact members 40 are kept in pairs 42 after being stamped and formed. Thus the pair can be positioned on the surface 14 as a unit after which the strap 44 is removed so as to provide electrically separate members.

FIG. 3 illustrates triangular element 58 and a pair of collet tabs 60, the latter being part of the present invention.

Internally, the triangular element has a four-wire motor (not shown) consisting of a fixed armature and a rotating stator, an arrangement which is the reverse of a conventional electric motor. The three-sided shell 62 is attached to the stator. One side of the shell has a notch 63. At each end of the armature and fixed thereon is an insulative end cap 64.

From the base 66 of the cap a wedge shaped stub 68 projects forwardly from a shelf 70. There is a semi-circular opening 72 on each side of the stub with the opening being in alignment with a horizontal recess 74 in the surface of shelf 70. Outwardly the recess terminates in a transverse slot 76 almost at the shelf edge. A vertical recess 78 cuts through the horizontal recess 74 just inwardly from slot 76. The top of the vertical recess coincides with a notch 80 cutting through base 66.

Collet tabs 60 are stamped and formed from beryllium copper or other like conductive metal. Each tab has a cylindrical tube section 82 and a strap 84 extending laterally from the base of the cylinder. The free end of the strap is bent at a right angle thereto to provide a spur 86. Two tabs 60 are positioned on each end cap 58 with the cylindrical tube section 82 in opening 72, with the strap 84 in horizontal recess 74 and spur 86 in slot 76.

With reference to FIG. 5, wires 88 coming from the motor within the triangular element are attached to strap 84 on each collet tab 60.

With reference to FIG. 4 a housing cell 10 is shown with cell contact members and end caps 64 in place. The triangular shell 62 and its internal motor have been omitted for the sake of clarity. The element 58 is loaded into the cell by first aligning the stub 68 with notch 63 so that the narrow end 90 of the stub is nearest the opening. The element, with notch 63 facing downwardly, is pushed into bracket 28. The element is set in place with the narrow end 90 resting in the arcuate pocket 30. The arcuate contact surfaces 52 on the cantilever spring arms 50 are in contact with the cylindrical tube sections 82 on the collet tabs. The motor is electrically connected to the cell contact members so that a current passing through the contact members and collet tabs energize the motor.

The foregoing detailed description has been given for clearness of understanding only, and no unnecessary limitations should be understood therefrom as some modifications will be obvious to those skilled in the art.

What is claimed is:

1. An electrical contact system for supplying a current from a circuit board to a motor suspended between two walls which comprises:
   a. two pair of conductive contact members with one member of each pair being the mirror image of the other member, each contact member positioned over an edge of an opposing surface of said walls and having an elongated body with contact means on its lower end adapted to electrically engage a circuit on a circuit board and on the upper end a cantilever spring arm extending generally in a curving manner from the body so that the arm's free end projects downwardly, said free end being arcuate and facing the arcuate free end of the contact member position near the other side of the same wall; and
   b. two pair of conductive collet tabs each having a cylindrical tube section and a strap extending laterally from the base of the cylindrical tube section each pair of collet tabs being positioned on opposite ends of the motor with electrical wires therefrom being fixed to said straps so that when the motor is suspended between the two walls said cylindrical tube sections are received in the arcuate free ends of the cantilever spring arms whereby an electrical current may pass from the circuit board to the motor.

2. The electrical contact system of claim 1 further including retaining means on the body of each contact member for holding said member on the surface of the wall.

* * * * *